UNITED STATES PATENT OFFICE 2,323,658

PYRETHRUM ACTIVATED AND STABILIZED WITH POLYETHERAMINES

William F. Hester, Drexel Hill, Pa., assignor to Röhm & Haas Company, Philadelphia, Pa., a corporation of Delaware No Drawing. Application February 27, 1942, Serial No. 432,625

8 Claims. (Cl. 167—22)

This invention relates to insecticidal compositions containing as active parasiticidal agents the active ingredients of pyrethrum and a compound of the formula:

$$[R(OC_nH_{2n})_x]_mNR'_{3-m}$$

wherein R is an aliphatic hydrocarbon group having one to twelve carbon atoms, $C_nH_{2n}$ represents an alkylene group in which $n$ is an interger having a value of two to four inclusive, $x$ is an integer having a value of one or more, $m$ is an integer having a value of 2 to 3 inclusive, and R' is hydrogen or a hydrocarbon group or a hydroxyalkyl group. Typical groups for R include branched, straight chain, saturated, and unsaturated groups, such as methyl, ethyl, isopropyl, allyl, methallyl, isobutyl, n-butyl, amyl, hexyl, octyl, capryl, undecenyl, dodecyl, etc. In addition to hydrogen, R' may represent a hydrocarbon group such as methyl, ethyl, allyl, butyl, octyl, phenyl, benzyl, cyclohexyl, etc., or a hydroxyalkyl group, such as —$C_2H_4OH$ or —$CH_2CHOHCH_3$. When R' is a hydrocarbon group, it is preferred that this group contain not over seven carbon atoms.

The group represented by $C_nH_{2n}$ may be an alkylene group such as —$CH_2CH_2$—,

—$CH_2CH_2CH_2$— and —$CH_2CH_2CH_2CH_2$—, or a branched chain such as —$CH_2CH(CH_3)$— or

—$CH_2CH(CH_3)CH_2$—.

The open chain polyether amines used in the present invention in conjunction with pyrethrum may be prepared from alkoxyalkylene halides, the alkylene group of which may be interrupted by oxygen, by reaction with ammonia under pressure. The products may be distilled to separate the secondary and tertiary amines from any primary amine which may be formed. The primary amine may be returned to the reaction system as this type of primary amine is less desirable as an insecticide than the amines containing two or three ether chains. In place of ammonia there may be used a primary aliphatic, cycloaliphatic, or aryl amine, such as methylamine, ethylamine, cyclohexylamine, aniline, or the like. In this case the products having two ether-containing radicals are separated and used in insecticidal compositions.

The secondary amines forming part of the reaction products and having one ether substituent and a second substituent corresponding to that of the primary amine used may, if desired, be used in a second reaction mixture and converted to the tertiary amine having two ether-containing substituents.

Typical of the compounds which may be thus prepared are the following:

$(C_2H_5OC_2H_4OC_2H_4)_2NH$
$(C_2H_5OC_2H_4OC_2H_4)_3N$
$(C_8H_{17}OC_2H_4OC_2H_4OC_2H_4)_2NH$
$(C_8H_{17}OC_2H_4)_3N$
$(C_4H_9OCH_2CH(CH_3)O(CH_3)CHCH_2)_2NH$
$(CH_3OCH_2CH_2OCH_2CH_2OCH_2CH_2)_2NH$
$(CH_3OCH_2CH_2CH_2OCH_2CH_2)_3N$
$(CH_3OCH_2CH_2CH_2OCH_2CH_2)_2NH$
$(C_5H_{11}OCH_2CH_2OCH_2CH_2OCH_2CH_2OCH_2CH_2)_3N$
$(C_3H_7OCH_2CH_2OCH_2CH_2)_2NC_2H_5$
$(C_6H_{13}OCH_2CH_2OCH_2CH_2)_2NCH_2C_6H_5$
$C_4H_9OCH_2CH_2OCH_2CH_2)_2NC_6H_5$ Any one of these amines may be used in an insecticidal composition or there may also be used mixtures of the various secondary and tertiary alkoxyalkylene amines. In addition, the alkoxyalkylene amines may be used in conjunction with other insecticidal agents or with fungicidal agents.

I have found that pyrethrum or a pyrethrum extract and an alkoxyalkylene amine of the above formula together provide exceptionally effective contact sprays, which are free from irritating or phytocidal action. The pyrethrum and amine combination is synergistic and permits the use of concentrations of combined toxicants lower than would be possible with the individual toxicants to give good control of various insects including flies, fleas, mosquitos, roaches, aphids, and other soft-bodied insects and the like.

These two types of toxicants may be combined in a solvent, such as kerosene, for use against flies and similar pests. They may be combined in oil emulsions, which are particularly effective in controlling red mites, aphids, etc. Similarly, the alkoxyalkylene amines defined above may be used in dusts, for example, being taken up on ground pyrethrum flowers with or without inert diluents.

The following examples illustrate the preparation of typical alkoxyalkylene amines and their use, particularly in conjunction with pyrethrum.

Example 1

A mixture of 180 parts of butoxyethoxyethyl chloride and 34 parts of anhydrous ammonia was heated in an autoclave at 225° C. under pressure for four hours. The reaction mixture was cooled, treated with alkali, and distilled. The fraction boiling between 151° and 156° C. at 2.5 mm. pressure was found to consist essentially of $(C_4H_9OC_2H_4OC_2H_4)_2NH$.

The fraction distilling between 180° and 210° C. at 2.5 mm. pressure consisted of $(C_4H_9OC_2H_4OC_2H_4)_3N$.

These fractions were tested according to the standard Peet-Grady procedure as the sole toxicants in fly sprays made with a refined kerosene. A spray containing 95% of kerosene and 5% of the secondary product gave a knockdown of 97% and a kill after 24 hours of +14 compared to the Official Test Insecticide (a solution of pyrethrum equivalent to 5% pyrethrum 20:1). A similar spray containing 5% of the tertiary product gave a knockdown of 97% and a kill after 24 hours of +17 compared with the O. T. I. A mixture of 50% of each of the two products was also tested in a 5% spray, giving a 97% knockdown and a kill of +16 compared to the O. T. I. A particularly significant feature of all of these sprays was that they had no more odor than the kerosene without the toxicants. The sprays caused no nasal or skin irritation to workers exposed to them.

A concentrate was prepared from 10 parts of $(C_4H_9OC_2H_4OC_2H_4)_3N$, 15 parts of the reaction product of polyglycerol and cocoanut acids (as an emulsifier), and 75 parts of a petroleum spray oil. This concentrate was diluted at 1:100 with water and applied in March as a dormant spray to apple trees which had been infested with red mites and aphids. At the end of April, counts were made of the red mite eggs which had hatched and those which had been killed. A control up to 84% was obtained on different apple trees. Control with a known insecticide used for comparison in the same orchard was 60%.

The combination described above was used at 1:100 against eggs of the bean weevil with a 96% kill and against the meal worm with 100% kill. Against the meal worm at 1:200 a 95% kill was obtained.

Another concentrated spray material was prepared from 20 parts of the above compounds, 25 parts of the same emulsifier, and 55 parts of spray oil. This was applied in aqueous sprays at 1:300 to greenhouse roses infested with red spiders. Controls of 93% and 94% were obtained. No injury resulted to the plants. The same sprays applied to bean plants infested with red spiders consistently gave a 100% control.

*Example 2*

A mixture of 225 parts of a butoxyethoxyethyl bromide and 60 parts of methylamine was heated in an autoclave at 225–250° C. for about four hours. The reaction product was cooled, treated with alkali, and distilled. The fraction distilling between 140° C. and 150° C. at 3 mm. pressure corresponded in composition to $(C_4H_9OC_2H_4OC_2H_4)_2NCH_3$.

It was tested in a fly spray with kerosene as the vehicle according to standard methods. A knockdown of 97% was obtained and a kill of +5 against the O. T. I. Dispersed in a spray at 1 pound per 100 gallons, an 80% control of bean beetle larvae was obtained.

A similar product is obtained by substituting an equivalent amount of aniline for the methylamine. The di(butoxyethoxyethyl)-phenyl amine distilled between 215° C. and 220° C. at 3.5 mm. pressure. An aqueous spray containing 0.5% of this material gave 100% control of Mexican bean beetle larvae on bean plants and a 73% control at 1 pound per 100 gallons of spray.

Another similar product was prepared from cyclohexyl amine and butoxyethoxyethyl chloride. The resulting tertiary amine boiled at 125–150° C. at 2.5 mm. It showed particular effectiveness against aphids and bean beetle larvae.

*Example 3*

Two parts of the mixture of 50% each of $(C_4H_9OC_2H_4OC_2H_4)_2NH$ and $(C_4H_9OC_2H_4OC_2H_4)_3N$ was combined with three parts of pyrethrum (20:1) extract, diluted with kerosene to 100 parts, and tested against flies by the Peet-Grady technique. A knockdown of 97% was obtained and a kill of +30 compared to the O. T. I.

One part of the mixture of amines and four parts of the pyrethrum extract in 100 parts of fly spray gave a knockdown of 99% and a kill of +21 compared to the O. T. I. Three parts of the amine mixture with three parts of pyrethrum extract in 100 parts of fly spray gave a knockdown of 99% and a kill of +30 compared to the O. T. I.

*Example 4*

The mixture of the secondary and tertiary amines shown above was tested against roaches. A 1% solution gave a kill of +2 compared to the O. T. I. (5% pyrethrum 20:1) while a 2% solution of the mixed amines gave a kill of +17 and 8% a kill of +28.

*Example 5*

A mixture of methyl alcohol, β, β'-di-chloroethyl ether, sodium hydroxide, and water was heated at 80 C. for 24 hours, cooled, filtered, and fractionated. From the distillates there were taken the fractions which contained about the correct chlorine content for $CH_3OC_2H_4OC_2H_4Cl$. These fractions were combined to give 139 parts of intermediate which was heated in an autoclave at 225° C. with 34 parts of anhydrous ammonia. The reaction product was treated with 77 parts of 52% sodium hydroxide solution and 150 parts of water and extracted three times with benzene. Finally, the product was carefully distilled. The fraction boiling between 95° C. and 135° C. at 2 mm. contained essentially $(CH_3OC_2H_4OC_2H_4)_2NH$, and the fraction boiling between 161° and 165° C. at 2 mm. contained essentially $(CH_3OC_2H_4OC_2H_4)_3N$.

Without further purification these fractions were made into a 5% fly spray and tested by the Peet-Grady procedure. The knock-down obtained with the secondary product was 56% and the kill in 24 hours —12 compared to the O. T. I. The tertiary amine gave a kill of —9 and a knockdown of 65%. Both fly sprays were free from odor or irritation.

*Example 6*

To a mixture of 74.6 parts of triethanolamine and 60 parts of sodium hydroxide there was added 270 parts of butoxyethoxy ethyl chloride, and the mixture was heated for two hours at 120° C.–130° C. on an oil bath under a reduced pressure of about 60 mm. As water formed in the reaction, it was removed. The reacted mixture was cooled, washed with water, separated, dried over sodium sulfate and distilled under reduced pressure. The fraction distilling between 225° and 230° C. under 3 mm. pressure, consisting of 46 parts, corresponded in composition to $$(C_4H_9OC_2H_4OC_2H_4OC_2H_4)_2NC_2H_4OH$$

It contained by analysis 3.12% of nitrogen.

This fraction was taken up in kerosene to prepare a fly spray which was adjusted to a 5% concentration of the above product. By the Peet-Grady test this spray gave an 86% knockdown and a kill of −5 against the O. T. I.

*Example 7*

A mixture of 82 parts of triethanolamine, 66 parts of sodium hydroxide, and 318 parts of normal octyl bromide was heated at 130°–140° C. on an oil bath for four hours. The reaction mixture was then cooled, washed with water, dried over sodium sulfate, and distilled under reduced pressure. A fraction distilling between 165° C. and 185° C. at 3 mm. pressure was chiefly $$(C_8H_{17}OC_2H_4)_2NC_2H_4OH$$

with a small amount of the mono-octyloxyethyl ethanolamine. The fraction distilling between 185° C. and 205° C. was practically pure bisoctyloxyethyl ethanolamine. These products in a series of tests gave knockdowns of 74 to 77% and kills from −14 to −5 against the O. T. I.

By methods generally similar to those described above, there may be prepared a great variety of aliphatic oxyalkylene amines which are secondary or tertiary. In contrast thereto, the corresponding primary amines appear to be less effective and are not sufficiently free from odor and irritation. The secondary and tertiary ether amines provide a wide variety of ether amines from which one or more members may be selected for any particular insecticidal or ovicidal purpose. The most available compounds are those containing ethylene ether groups and of these the ether amines having a terminal aliphatic group of 3 to 8 carbon atoms and 2 to 4 oxyethyl groups are preferred. It is also preferred in the case of those tertiary amines having two alkoxyalkylene groups that the third N-substituent have not over seven carbon atoms.

*Example 8*

A mixture of 180 parts of butoxyethoxyethyl chloride and 35 parts of anhydrous ammonia was heated in an autoclave at 255° C. under pressure for four hours. The reaction mixture was cooled, washed with dilute soda ash solution and with water, dried, and heated to remove the more volatile materials, leaving a residue containing a crude mixture of di- and tri-butoxyethoxyethyl amines.

This residue was taken up in deodorized kerosene and diluted to give sprays containing 1%, 2%, 4%, 5%, and 8% of the crude mixed amines and tested against flies with resulting kills of 27%, 39%, 52%, 56%, and 62% for the respective concentrations. The knockdown within the first ten minutes after the sprays were applied according to the Peet-Grady technique were 58%, 70%, 82%, 87%, and 94% for the respective concentrations.

Pyrethrum 20:1 extract was diluted to 2%, 3%, 4%, 5%, 7.5% and 10% sprays with kerosene. Kills of flies were determined by the Peet-Grady procedure as 20%, 30%, 40%, 50%, 62%, and 70% for the respective concentrations.

Mixtures of the crude amines and of pyrethrum 20:1 extract were then prepared and tested by the same technique. The following results were obtained:

| Amines | Pyrethrum extract | Knockdown | Kill |
|---|---|---|---|
| Per cent | Per cent | Per cent | Per cent |
| 1 | 4 | 99 | 67 |
| 2 | 4 | 100 | 74 |
| 3 | 3 | 100 | 70 |
| 4 | 2 | 100 | 66 |

It will be seen that the knockdowns and kills obtained are much greater than would result from either individual toxicant taken at the combined percentages of the two toxicants. For example, 4% of pyrethrum fortified with only 1% of crude amine mixture gives a kill corresponding to that obtained with 8% to 9% of pyrethrum by itself, or 4% of the crude amines fortified with 2% of pyrethrum extract gives a kill corresponding with the maximum obtainable from even an excessive percentage of the crude amine as the sole toxicant.

The crude mixture of amines was also tested against roaches. A kerosene spray containing 4% of the mixture killed 17% of the roaches and rendered another 17% moribund, giving a control of 34%. A 5% pyrethrum (20:1) spray killed 38%, rendered 20% moribund, and gave, therefore, a control of 58%. A spray containing 3% of the crude mixture of amines and 3% of the pyrethrum extract in kerosene killed 52% and rendered 17% moribund, giving a control of 69%.

The alkoyalkylene amines were found to have a marked stabilizing action on the pyrethrum. The original color of the solutions was retained, and the activity of the mixtures was maintained on aging of the solutions.

*Example 9*

The crude mixture of di- and tri-butoxyethoxyethyl amines was applied to clay from solvents, which were then evaporated to yield a dust. A dust containing 5% of the crude mixture was applied to bean plants infested with aphids. A kill of 27% was obtained. A dust containing 0.5% pyrethrins was likewise tested with a kill of 51%. A dust containing 0.5% pyrethrins and 2% of the crude mixture of amines gave a kill of 91%, while a dust containing 0.25% pyrethrins and 2% of the mixed amines gave a kill of 71%.

The combination of a dialkoxyalkylene amine, trialkoxyalkylene amine, or a mixture of such amines with pyrethrum provides a contact insecticidal spray of particular merit. The combination exhibits an effectiveness which is greater than can normally be obtained from practical concentrations of either type of toxicant used alone. The amines exert a desirable stabilizing effect on the pyrethrum. Sprays containing the combined toxicants are free from irritating action and have no objectionable odor.

This application is a continuation-in-part of my application Serial No. 408,329, filed August 26, 1941.

I claim:

1. Insecticidal compositions having as active ingredients pyrethrum and a compound of the formula $$[R(OC_nH_{2n})_x]_mNR'_{3-m}$$

where R is an aliphatic hydrocarbon group of less than 13 carbon atoms, $C_nH_{2n}$ represents an alkylene group in which $n$ is an integer having a value of two to four inclusive, $x$ is an integer of at least one, $m$ is an integer having a value of two or three inclusive, and R' is a member of the class consisting of hydrogen, hydroxyalkyl, and hydrocarbon groups.

2. Insecticidal compositions having as active ingredients the active principles of pyrethrum and a compound of the formula $$[R(OC_nH_{2n})_x]_mNR'_{3-m}$$

wherein R is an aliphatic hydrocarbon group of less than 13 carbon atoms, $C_nH_{2n}$ represents an alkyene group in which $n$ is an integer having a value of two to four inclusive, $x$ is an integer of at least one, $m$ is an integer having a value of two to three inclusive, and R' is a member of the class consisting of hydrogen, hydroxyalkyl, and hydrocarbon groups.

3. Insecticidal compositions having as active ingredients the active principles of pyrethrum and a compound of the formula $$[R(OC_nH_{2n})_x]_mNH_{3-m}$$

wherein R is an aliphatic hydrocarbon group of three to eight carbon atoms, $n$ and $x$ are integers having values of two to four inclusive, and $m$ is an integer having a value of two or three inclusive.

4. Insecticidal compositions having as active ingredients the active principles of pyrethrum and a compound of the formula $$[R(OC_nH_{2n})_x]_2NH$$

wherein R is an alkyl group of three to eight carbon atoms, and $n$ and $x$ are integers having values of two to four inclusive.

5. Insecticidal compositions having as active ingredients the active principles of pyrethrum and a compound of the formula $$[R(OC_nH_{2n})_x]_3N$$

wherein R is an alkyl group of three to eight carbon atoms, and $n$ and $x$ are integers having values of two to four inclusive.

6. Insecticidal compositions having as active ingredients the active principles of pyrethrum and a compound of the formula $$(C_4H_9OCH_2CH_2OCH_2CH_2)_mNH_{3-m}$$

wherein $m$ is an integer having a value of two to three inclusive.

7. Insecticidal compositions having as active ingredients the active principles of pyrethrum and a compound of the formula $$(C_4H_9OCH_2CH_2OCH_2CH_2)_2NH$$

8. Insecticidal compositions having as active ingredients the active principles of pyrethrum and a compound of the formula $$(C_4H_9OCH_2CH_2OCH_2CH_2)_3N$$

WILLIAM F. HESTER.